Figure 4:
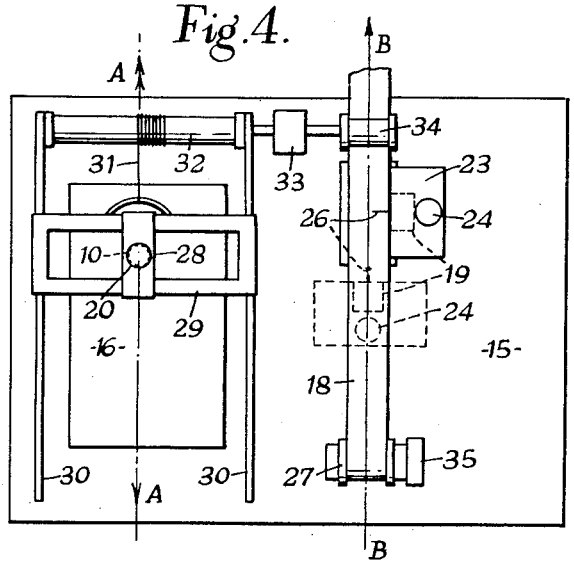

Nov. 20, 1956 W. HALLIDAY ET AL 2,770,966
APPARATUS FOR NON-DESTRUCTIVE TESTING OF
SOLID BODIES BY ACOUSTIC OSCILLATIONS
Filed Dec. 12, 1952 4 Sheets-Sheet 1
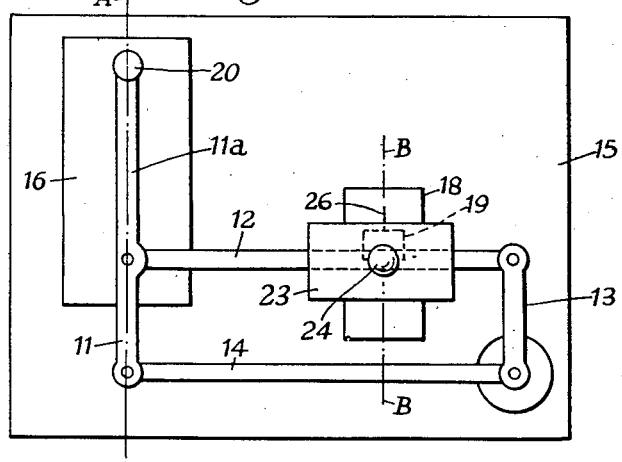
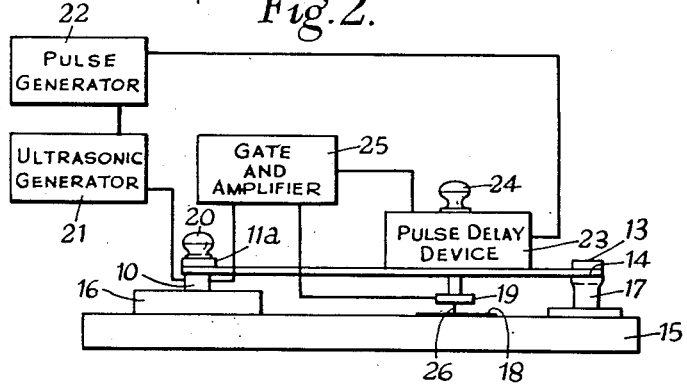
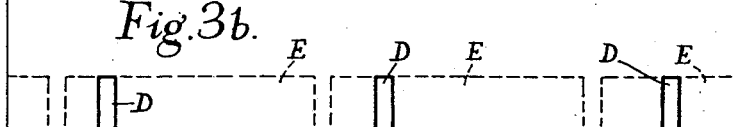
INVENTORS
W. HALLIDAY
H. M. JEFFREYS
BY
ATTORNEYS INVENTORS
W. HALLIDAY
H. M. JEFFREYS
BY
Moore & Hall
ATTORNEYS

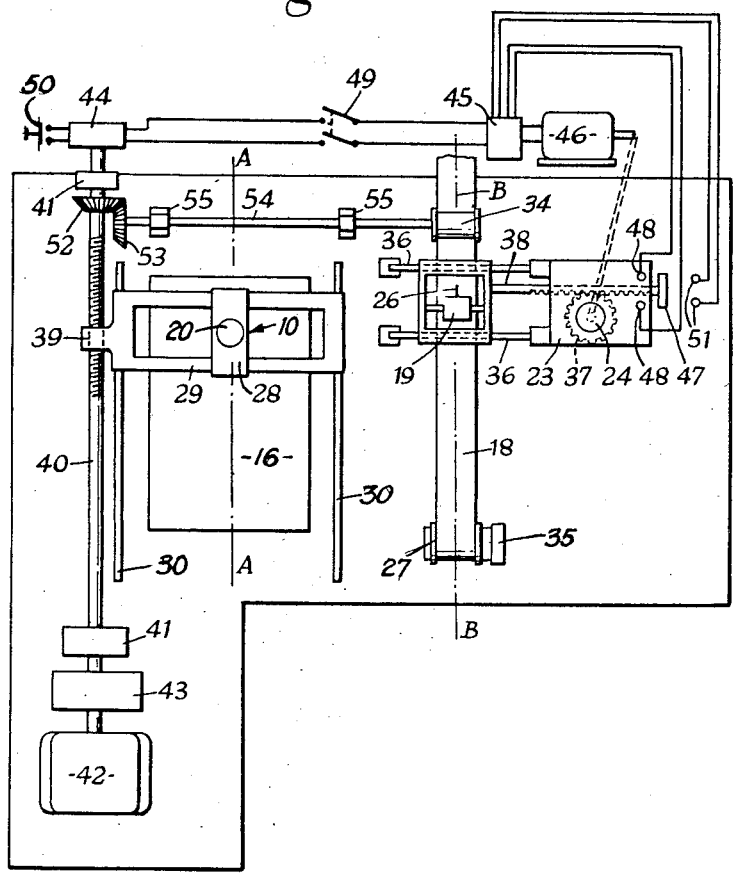

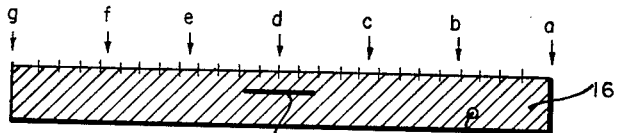
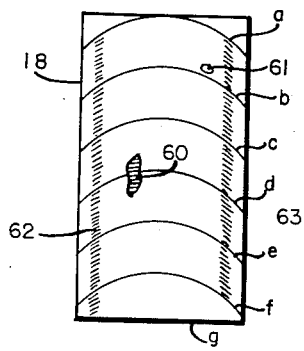
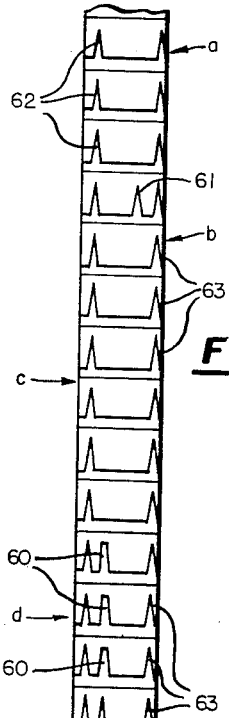
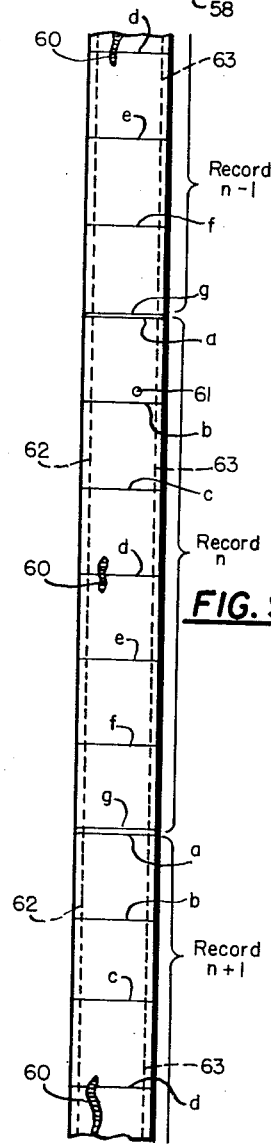
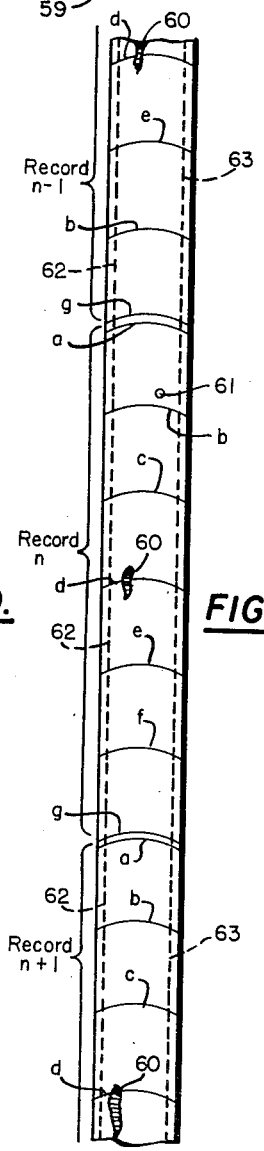

United States Patent Office 2,770,966
Patented Nov. 20, 1956

2,770,966

APPARATUS FOR NON-DESTRUCTIVE TESTING OF SOLID BODIES BY ACOUSTIC OSCILLATIONS

William Halliday and Herbert Martin Jefferys, Barkingside, England, assignors to Kelvin and Hughes Limited, Glasgow, Scotland, a company of Great Britain Application December 12, 1952, Serial No. 325,502

Claims priority, application Great Britain December 13, 1951

12 Claims. (Cl. 73—67.9)

The present invention relates to the non-destructive testing of solid bodies, particularly but not exclusively metal bodies.

In order to test solid bodies for flaws, such as blowholes in castings, faults in welded joints, and flaws in cast and wrought materials, it has been proposed to apply mechanical vibrations of ultrasonic frequency to the body and to examine the effects of the body on the propagation of these vibrations. Examples of this method of testing are described in the book "Ultrasonics" by B. Carlin published in 1949 by the McGraw-Hill Book Company Inc. The present invention is concerned with this method of testing which will be referred to hereinafter as the non-destructive acoustic method.

It is an object of the invention to provide apparatus for the non-destructive testing of solid bodies and for the recording of the results of such tests with which a classical mechanical recorder, such as a pen recorder, can be employed.

Another object of the invention is to provide non-destructive testing apparatus with which a permanent record of the results of the tests can be obtained immediately upon performance of the tests.

A further object of the invention is to provide non-destructive testing of a solid body yielding a permanent record of the results of such tests in a form giving the geometry of the flaws in the body under test and immediately upon performance of the tests.

In recording the results of non-destructive acoustic tests it has been proposed to use the reflected oscillations to produce electrical potentials which are representative thereof and to apply the said electrical potentials to a cathode ray tube to produce deflections of the beam therein and to photograph the screen of the cathode ray tube. Where, however, a large number of tests are to be made this method of recording is expensive, and it is the object of the present invention to provide a relatively cheap apparatus for recording the results of such tests.

According to the present invention recording apparatus for use in recording non-destructive acoustic tests of solid bodies comprises means for moving relatively to one another in a first direction a strip of paper or other suitable recording material and a marking device such as a recording pen in dependence upon the movement of an acoustic transmitter over the surface of a body to be tested, applying received reflected oscillations through a gate device to control mechanism for the pen, means for providing a gating pulse for each transmitted burst of vibrations, means for varying the phase of the gating pulse relatively to that of the transmitted pulse in such a manner that reflected oscillations pass through the gate only when their time of occurrence coincides with that of the gaiting pulse, and means for moving the pen and the paper relatively to one another in a second direction transverse to said first direction in dependence upon changes in the phase of the gating pulse whereby the recording pen is moved to a transverse position related to the depth in the body of a flaw.

Embodiments of the invention will now be described, by way of example, with reference to the accompanying diagrammatic drawings, wherein:

Fig. 1 is a plan view of a first embodiment,

Fig. 2 is a combined view in elevation and a schematic of the electrical circuit of the embodiment in Fig. 1, Figs. 3a and 3b are diagrams of pulse waveforms present in the electrical circuit of Fig. 2, Figs. 4 to 6 are plan views of other embodiments, Figure 7 is a section through a body to be tested taken on the lines A—A in Figures 1 and 4 to 6, and Figures 8 to 11 show the forms of record obtained with the embodiments shown in Figures 1 and 4 to 6.

Referring now to Figs. 1 to 3, in the first embodiment of the invention a probe 10 is mounted on a pantograph framework comprising arms 11, 12, 13 and 14, the probe being secured to an extension 11a of the arm 11. The pantograph is mounted on a table 15 by means of a pillar 17 rigid with the table, the fixed point of the pantograph coinciding with the axis of the pillar 17. A body 16 to be tested and a paper 18 on which a record is to be made are mounted on the table. A standard pen recorder 19 is mounted on the arm 12 of the pantograph, and the arrangement is such that the pen recorder 19 is stationary when the probe is stationary, and when the probe is moved over the surface of the body 16, for example in the direction of the line A—A in Fig. 1, the pen recorder is moved relatively to the paper 18 in the direction of the line B—B. Thus, the relative positions of the pen recorder and the paper are an indication of the position of the probe on the body to be tested. The probe can be moved over the surface of the body by means of an operator's handle 20.

The probe 10 is supplied with a succession of uniformly-spaced pulses of ultrasonic oscillations from a generator 21, the frequency of recurrence of the pulses and their duration being controlled by pulses supplied to the ultrasonic generator 21 from a pulse generator 22. In the spaces between each two successive pulses the probe serves as a receiver for mechanical vibrations originating from the pulses and reflected back towards the probe by flaws and imperfections etc. in the body under test. In practice the frequency of recurrence of the pulses is 50 per second or more at an ultrasonic frequency of about 2 megacycles. An example of the waveform of the pulses C transmitted by the probe 10 is shown in Fig. 3a.

The pulses from the generator 22 are also supplied to a pulse delay device 23 provided with a manual control handle 24. The device 23 may comprise, for example, a "one-shot" multivibrator such as is described in "Principles of Radar" by the staff of the Massachusetts Institute of Technology, published by McGraw-Hill, chapter 2, article 15. The pulses fed to the device 23 serve to trigger the multivibrator, which after a time interval determined by the setting of the control handle 24, supplies a gating pulse which is fed to a gate and amplifier 25 and opens the gate. The oscillations received by the probe 10 are applied to the gate, but only the oscillations applied while the gate is held open by the gating pulses are passed by the gate and applied to actuate the pen recorder 19 and produce a mark on the paper 18.

The gating pulses D occur in the spaces (Fig. 3b) between successive transmitted pulses C, and the effect of varying the phase of the gating pulses relatively to that of the transmitted pulses is that the signals applied to the pen recorder 19 are reflections from varying depths in the body under test. The pen 26 of the pen recorder 19 is coupled to the control handle 24 and rotation of the handle moves the "nib" of the pen over the paper 18 transversely of the line B—B. Thus, the depth in the body under test of a flaw which has caused reflection, and thereby actuation of the pen recorder, is indicated by the distance between the mark on the paper 18 and a datum line which may of course be already printed on the paper.

By moving the probe 10 and hence the pen recorder in steps along the lines A—A and B—B respectively, and at each step operating the control handle 24 in such a manner as to provide simultaneously a variation in phase and a transverse movement of the pen equivalent to the maximum depth of the material, the geometry of a flaw can be recorded. If necessary the bottom echoes can also be recorded to indicate the position of the flaw relatively to two faces of the body.

For example, the body 16 under test may be assumed to have the section taken on the line A—A shown in Figure 7, the body being faulty owing to the presence of an internal crack 58 and an internal blowhole 59. The trace produced with the first embodiment of Figures 1 to 3 on the paper 18 is shown in Figure 8, the paper being provided with ruled lines $a$, $b$, $c$, $d$, $e$, $f$ and $g$ which correspond to the positions along the length of the body 16 indicated by the arrows $a$ to $g$ in Figure 8. The ruled lines are curved to a radius equal to that of the locus of the "nib" of the pen recorder.

In this embodiment the pen is biased, e. g. in known manner by a light spring, so that the "nib" thereof is out of contact with the paper 18 as long as the pen recorder is receiving low intensity random signals such as are generally classified as "noise." Upon receipt of an echo signal of appreciably greater intensity than the "noise" the nib of the pen is moved into contact with the paper and makes a mark. With this embodiment and the specimen shown in Figure 7, the crack 58 gives rise to a trace such as 60, and the blowhole 59 gives rise to a trace such as 61.

If the delay provided by the pulse delay device 23 is substantially zero, pulses fed to the probe 10 coincide, at least in part, with the gating pulses and signals, which may be regarded as instantaneous echoes, are fed to the pen recorder and give rise to a regular series of marks 62. Another regular series of marks 63 will also be made corresponding to the echoes reflected by the surface of the body 16 further from the probe 10. Marks indicating flaws within the body will usually be irregular and can therefore be distinguished readily from the regular series of marks 62 and 63. Marks produced by surface flaws will be lost in the series of marks 62 and 63, but such surface flaws will be detected readily by inspection of the specimen.

In the embodiment described above the intensity of the reflected oscillations received by the probe can also be recorded by using a paper 18 of the type with which the intensity of the mark produced thereon varies with the potential difference applied between the pen "nib" and the paper e. g. Teledeltos or potassium iodide paper.

In a second embodiment shown in Fig. 4 the pen recorder 19 is stationary and the paper takes the form of a strip which is unrolled from a reel 27 as the probe 10 is moved in the direction of the line A—A. The probe 10 is fixedly mounted on a slide 28, which is in turn mounted for sliding movement transversely of the line A—A on a frame 29. The frame 29 is mounted for sliding movement parallel to the line A—A on spaced, parallel guides 30. A steel wire or tape 31 connects the frame 29 to a roller 32, which is spring biased in known manner in a direction to roll the wire or tape upon itself. The roller 32 is connected through a ratchet drive and speed reduction gear 33 to a pair of rolls 34, between which the paper 18 passes and which are adapted to pull the paper from the reel 27 against the action of a friction brake 35, which prevents the reel 27 from overrunning. As the probe 10 is moved in the direction of the single arrow on the line A—A the wire or tape unwinds from the roller 32 and tightens the return spring thereof (not shown), the rotation of the roller 32 imparting rotation to the feed rolls 34 in a sense to cause movement of the paper in the direction of the arrow on the line B—B. During movement of the probe 10 in the direction of the double arrow on the line A—A, no rotation is imparted to the feed rolls owing to the presence of the ratchet drive in the device 33.

In this embodiment the pen recorder 19 may be disposed in two positions indicated respectively by solid and broken lines in Fig. 4. As with the first-described embodiment, the "nib" of the pen 26 is held out of contact with the paper strip as long as only "noise" signals are received by the pen recorder. In the position shown in solid lines rotation of the control handle 24 causes movement of the "nib" of the pen 26 along a straight line transverse to the direction of the line B—B through any well-known coupling e. g. a rack connected to the pen and a pinion connected to the shaft carrying the handle 24. With the pen recorder 19 in this position the successive records $n-1$, $n$, $n+1$, etc., produced on the paper strip 18 during successive traverses of the probe parallel to the line A—A follow one another longitudinally along the strip head-to-tail, as shown in Figure 9. In the alternative position shown in broken lines the pen 26 can be directly coupled to the handle 24, as in the first embodiment. With this alternative position the records produced on the paper strip also follow one another longitudinally along the length of the strip, each record being composed of curved lines, as shown in Figure 10.

A third embodiment shown in Fig. 5 incorporates the paper feed mechanism shown in Fig. 4, but the whole pen recorder 19 is mounted on guides 36 for movement transversely of the line B—B, such movement of the recorder being produced by means of a pinion 37 rotatable by the handle 24 and engaging a rack 38 connected to the recorder mounting. The "nib" of the pen 26 is continuously in contact with the strip and the signals applied to the pen recorder 19 cause movement of the pen parallel to the direction of the line B—B, the magnitude of the pen movement being determined by the magnitude of the signals applied to the recorder.

This third embodiment is adapted for simultaneous, automatic control of the movement of the probe 10 and operation of phase control during the periods that the probe is at rest. Thus, the frame 29 has an extension 39 working as a nut on a threaded rod 40 which is rotatably mounted in bearings 41. The rod 40 is rotated by means of a motor 42 through a one-revolution clutch 43. The clutch is arranged in known manner to effect one complete rotation of the rod 40 during, for example, one complete revolution of the motor 42, whereupon the probe 10 is moved along the body 16 under test a distance equal to the thread pitch, and thereafter to permit the rod to remain stationary during a plurality of complete rotations of the motor.

At the end of each rotation of the rod a trip switch 44 connected to the rod is closed momentarily for a period long enough to cause operation of a motor control 45 of a motor 46, upon closure of the switch 44 the motor control starting the motor 46 running at a comparatively slow speed. The motor 46 is coupled to the control handle 24 and rotates it in a sense to cause movement of the pen recorder 19 to the left as seen in Figure 5. As the pen recorder 19 reaches its extreme left-hand position a bridge member 47 carried by the rack 38 closes two contacts 48. The closure of the contacts 48 causes operation of the motor control 45 to stop the motor 46 and thereafter to rotate it in the opposite direction at a comparatively fast speed, thus moving the pen recorder 19 back to a datum position relatively to the paper and the pulse delay device back to give a corresponding value of the phasing of the transmitted and gating pulses. As the pen recorder again reaches its datum position the one-revolution clutch 43 again engages for one revolution, so that the rod is again rotated by the motor 42 and the trip switch 44 again closes momentarily causing operation of the motor control 45 to reverse the direction of rotation of the motor 46, so that the cycle repeats.

A switch 49 is provided between the trip switch 44 and the motor control 45 which can be opened to stop the recording part of the apparatus when necessary. The said recording part of the apparatus is restarted by closing the switch 49 and operating a push button switch 50 which is connected in parallel with the trip switch 44, the push button switch thus causing operation of the motor control 45 in the same manner as the trip switch 44. When the switch 49 is opened the motor 46 rotates until the bridge 47 engages two contacts 51, thereby causing operation of the motor control 45 to stop the motor 46. The whole apparatus can be stopped by switching off the motor 42 by means of a switch which is not shown. In this embodiment the drive rolls 34 which move the paper strip are rotated by means of bevel gears 52 and 53 and a connecting rod 54, which is rotatably mounted in bearings 55.

The form of record which will be obtained with the embodiment of Figure 5 is shown in Figure 11, the record comprising a series of individual graphs following one another head-to-tail along the record. The ratio of the gearing between the rod 40 and the drive rolls 34 is so arranged that the record strip is moved a distance equal to the height of one graph upon each rotation of the rod 40 through one revolution. In the record shown in Figure 11 it is assumed that 25 graphs are required to form a complete record of the body 16 but only the first 17 are shown; the graphs corresponding to the positions *a, b, c,* etc. along the body are indicated.

The push button switch 50 can also be employed when it is desired to produce single graphs with the motor 42 disconnected. Operation of the push button causes operation of the motor control 45 whereby the motor 46 moves the pen recorder once across the strip and then returns it to the datum position.

Figure 6:
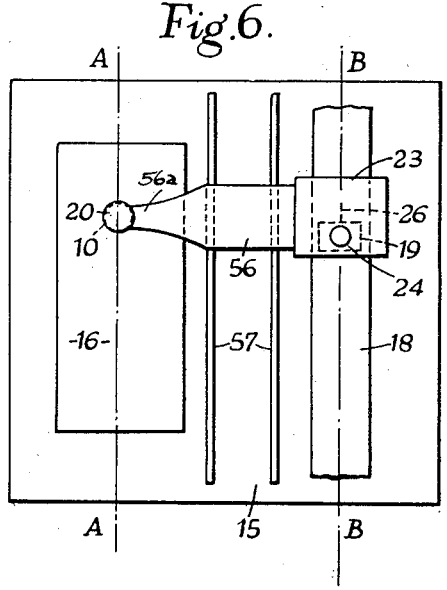

An embodiment shown in Figure 6 is especially suitable for the testing, for example, of long welds between two bodies, with which it is desirable that the record should have the same longitudinal dimension as the body under test. A slide 56 is mounted on two spaced guides 57 for movement parallel to the direction of the lines A—A and B—B. An extension 56a of the slide carries the probe 10 and its handle 20 and another extension carries the pulse delay device 23 and the pen recorder 19. The pen 26 is coupled directly to the control handle 24, as in the first embodiment, the form of record obtained being similar to that shown in Figure 8.

We claim:

1. Recording apparatus for use in recording non-destructive acoustic tests of bodies comprising, a probe for transmitting pulses of acoustic oscillations to a body to be tested and for receiving reflected oscillations, an oscillation generator connected to said transducer for energization thereof to produce said pulses of acoustic oscillations, means for moving said probe over the surface of such a body, a marking device including a pen, a recording material, means drivably connected with said probe moving means for moving said recording material and said pen relative to one another in a first direction in dependence upon said movement of the probe, an electronic gate device connected between said probe and said marking device, means connected to the gate device for applying thereto a gating pulse for each transmitted pulse of acoustic oscillations, each gating pulse being capable of opening the gate to permit the passage therethrough from the probe to the marking device of reflected oscillations having a time of occurrence coinciding with said gating pulse, means for varying the phase of gating pulses relative to the respective pulses of acoustic oscillations, and means drivably connected with said phase varying means for moving the recording material and said pen relative to one another in a second direction transverse to said first direction in dependence upon changes in the phase of the gating pulse.

2. Recording apparatus as claimed in claim 1, wherein the said marking device includes means responsive to the reflected oscillations received from the probe to cause displacement of the pen in a third direction transverse to said second direction the magnitude of the said displacement of the pen being related to the magnitude of the received reflected oscillations.

3. Recording apparatus as claimed in claim 1, wherein the said marking device includes means responsive to reflected oscillations received from the probe to cause displacement of the pen in a third direction parallel to said first direction, the magnitude of the said displacement of the pen being related to the magnitude of the received reflected oscillations.

4. Recording apparatus as claimed in claim 1, and for use in conjunction with a recording medium with which the intensity of the marks produced thereon is determined by the potential difference between the recording medium and the pen, wherein the said marking device includes means responsive to reflected oscillations received from the said probe to produce a potential difference between the said recording medium and the pen, the magnitude of the said potential difference being related to the magnitude of the received reflected oscillations.

5. Recording apparatus for use in recording non-destrucive acoustic tests of bodies comprising, an electric oscillation generator, a probe connected to said oscillation generator for receiving pulses of electric oscillations therefrom, for transmitting pulses of acoustic oscillations to a body to be tested and for receiving reflected acoustic oscillations, a pulse generator connected to said electric oscillation generator and supplying thereto pulses controlling the duration of the pulses of electric oscillations received by said probe, means for moving said probe over the surface of such a body, a marking device including a pen, a recording material, means drivably connected with said probe moving means for moving said recording material and said pen relative to one another in a first direction in dependence upon said movement of the probe, an electronic gate device connected between said probe and said marking device and connected to said pulse generator to receive therefrom gating pulses each corresponding to a respective pulse of acoustic oscillations, said gating pulses being capable of opening the gate to permit the passage therethrough from the probe to the marking device of reflected oscillations having a time of occurrence coinciding with said gating pulse, means for varying the phase of gating pulses relative to the respective pulses of acoustic oscillations and means drivably connected with said phase varying means for moving the recording material and said pen relative to one another in a second direction transverse to said first direction in dependence upon changes in the phase of the gating pulse.

6. Recording apparatus for use in recording non-destructive acoustic tests of bodies comprising an electric oscillation generator, a probe connected to said oscillation generator for transmitting pulses of acoustic oscillations to a body to be tested and for receiving reflected oscillations therefrom, a marking device including a pen, a recording material, a pantograph linkage drivably connecting said probe and the pen of said marking device to produce movement of said pen relative to said recording material in dependence upon movement of the probe, an electronic gate device connected between said probe and said marking device, means connected to the gate device and for applying thereto a gating pulse for each transmitted pulse of acoustic oscillations, each gating pulse being capable of opening the gate to permit the passage therethrough from the probe to the marking device of reflected oscillations having a time of occurrence coinciding with said gating pulse, means for varying the phase of gating pulses relative to the respective pulses of acoustic oscillations, and means drivably connected with said phase varying means for moving the recording material and said pen relative to one another in a second direction transverse to said first direction in dependence upon changes in the phase of the gating pulse.

7. Recording apparatus for use in recording non-destructive acoustic tests of bodies comprising an electric oscillation generator, a probe connected to said oscillation generator for transmitting pulses of acoustic oscillations to a body to be tested and for receiving reflected oscillations therefrom, means for moving said probe over the surface of such a body in a succession of steps and for keeping the probe stationary during the rest period between each two successive steps, a marking device including a pen, a recording material, means drivably connected with said probe moving means for moving said recording material and said pen relative to one another in a first direction in dependence upon said movement of the probe, an electronic gate device connected between said probe and said marking device, means connected to the said gate device for applying thereto a gating pulse for each transmitted pulse of acoustic oscillations, each gating pulse being capable of opening the gate to permit the passage therethrough from the probe to the marking device of reflected oscillations having a time of occurrence coinciding with said gating pulse, means for changing the phase of the gating pulses relative to the respective pulses of acoustic oscillations within predetermined limits during each of said rest periods, and means drivably connected with said phase changing means for moving the recording material and pen relative to one another in a second direction transverse to said first direction in dependence upon changes in the phase of the gating pulse.

8. Recording apparatus for use in recording non-destructive acoustic tests of solid bodies comprising an acoustic transducer mounted for movement over the surface of a body under test for selectively transmitting pulses of acoustic oscillations to said body and for receiving acoustic reflections therefrom, an oscillation generator connected to said transducer for energization thereof to produce said pulses of acoustic oscillations, means coupling said transducer to a recorder comprising a recording medium and a marking device, said last-named means including means for moving said recording medium and said marking device relatively to one aonther in a first direction in dependence upon the movement of the said acoustic transducer over the surface of said body, an electronic gate device, means applying received reflected oscillations through said gate device to said marking device, means coupled to said gate device for providing a selective gating pulse for each transmitted pulse of acoustic oscillations from said transducer, means for varying the phase of said gating pulse relative to the respective transmitted pulse of acoustic oscillations in such a manner that reflected oscillations pass through the said gate only when their time of occurrence coincides with that of the gating pulse, and means coupled to said recorder for moving the said recording medium and marking device relatively to one another in a second direction transverse to said first direction in dependence upon changes in the phase of the gating pulse whereby the marking device is moved to a transverse position related to the depth in the body of the point of reflection of the received reflected oscillations.

9. Recording apparatus as claimed in claim 8, wherein said means for providing a selective gating pulse for each transmitted pulse of acoustic oscillations include a pulse generator coupled to said oscillation generator for controlling the duration of the transmitted pulses of acoustic oscillations, said pulse generator also being coupled to said means for varying the phase of said gating pulse relative to the respective transmitted pulse.

10. The apparatus of claim 1 wherein said probe is mounted for straight-line movement.

11. Recording apparatus as claimed in claim 8, wherein the said recording medium is such that the intensity of the marks produced thereon is determined by the potential difference between the medium and the said marking device, said marking device being responsive to said received reflected oscillations applied through the said gate device to cause variations of the said potential difference.

12. Recording apparatus as claimed in claim 8, wherein the means for moving said recording medium and said marking device relatively to one another in dependence upon the movement of an acoustic transmitter over the surface of a body to be tested includes a pantograph connected between said acoustic transducer and said recorder, whereby the ratio of the magnitudes of the said relative movement and the said movement of the acoustic transducer is equal to the velocity ratio provided by the said pantograph.

References Cited in the file of this patent

UNITED STATES PATENTS 2,494,990     Delano     Jan. 17, 1950

FOREIGN PATENTS 170,212     Austria     Jan. 25, 1952